United States Patent
Jiang et al.

(10) Patent No.: US 9,390,711 B2
(45) Date of Patent: Jul. 12, 2016

(54) INFORMATION RECOGNITION METHOD AND APPARATUS

(71) Applicant: Huawei Device Co., Ltd., Shenzhen (CN)

(72) Inventors: Hongrui Jiang, Shenzhen (CN); Xiyong Wang, Shenzhen (CN); Junbin Liang, Shenzhen (CN); Weijun Zheng, Hangzhou (CN); Junyang Zhou, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/585,959

(22) Filed: Dec. 30, 2014

(65) Prior Publication Data

US 2015/0120301 A1   Apr. 30, 2015

Related U.S. Application Data

(63) Continuation of application No. PCT/CN2014/070489, filed on Jan. 10, 2014.

(30) Foreign Application Priority Data

Jan. 29, 2013   (CN) .......................... 2013 1 0034262

(51) Int. Cl.
  *G10L 15/08*   (2006.01)
  *G10L 15/22*   (2006.01)
  (Continued)

(52) U.S. Cl.
  CPC ................ *G10L 15/08* (2013.01); *G10L 15/19* (2013.01); *G10L 15/22* (2013.01); *G10L 17/22* (2013.01); *G10L 15/10* (2013.01); *G10L 2015/088* (2013.01); *G10L 2015/223* (2013.01)

(58) Field of Classification Search
  CPC ........ G10L 15/26; G10L 15/22; G10L 15/265
  USPC ......................................................... 704/251
  See application file for complete search history.

(56) References Cited

U.S. PATENT DOCUMENTS

| 5,732,187 A | 3/1998 | Scruggs et al. |
| 6,208,971 B1 | 3/2001 | Bellegarda et al. |

(Continued)

FOREIGN PATENT DOCUMENTS

| CN | 1323436 A | 11/2001 |
| CN | 1615508 A | 5/2005 |

(Continued)

OTHER PUBLICATIONS

Partial English Translation and Abstract of Chinese Patent Application No. CN103077714A, Feb. 4, 2015, 3 pages.

(Continued)

*Primary Examiner* — Jakieda Jackson
(74) *Attorney, Agent, or Firm* — Conley Rose, P.C.; Grant Rodolph; Adam J. Stegge

(57) ABSTRACT

An information recognition method and apparatus are provided. The method includes receiving, by a terminal, voice information, extracting a voice feature from the voice information, performing matching calculation on the voice feature and a phoneme string corresponding to each candidate text in multiple candidate texts to obtain a recognition result, where the recognition result includes at least one command word and a label corresponding to the at least one command word, and recognizing, according to the label corresponding to the at least one command word, an operation instruction corresponding to the voice information. A terminal recognizes text information, which is corresponding to voice information input by a user, as an operation instruction.

9 Claims, 2 Drawing Sheets

(51) Int. Cl.
*G10L 17/22* (2013.01)
*G10L 15/19* (2013.01)
*G10L 15/10* (2006.01)

(56) References Cited

U.S. PATENT DOCUMENTS

| | | |
|---|---|---|
| 6,836,758 B2 | 12/2004 | Bi et al. |
| 2002/0116192 A1 | 8/2002 | Shozakai |
| 2005/0043948 A1 | 2/2005 | Kashihara et al. |
| 2006/0015484 A1 | 1/2006 | Weng et al. |
| 2006/0116877 A1 | 6/2006 | Pickering et al. |
| 2006/0161431 A1 | 7/2006 | Bushey et al. |
| 2006/0252457 A1* | 11/2006 | Schrager ........... H04M 1/72519 455/556.1 |
| 2007/0078642 A1 | 4/2007 | Weng et al. |
| 2007/0185713 A1 | 8/2007 | Jeong et al. |
| 2008/0253549 A1* | 10/2008 | Loveland .......... G06F 17/30905 379/202.01 |
| 2010/0119053 A1* | 5/2010 | Goeldi .................. G06Q 10/00 379/265.09 |
| 2011/0007666 A1 | 1/2011 | Gurdan et al. |
| 2011/0106534 A1* | 5/2011 | Lebeau ................ G01C 21/265 704/235 |
| 2011/0112826 A1 | 5/2011 | Wang et al. |
| 2011/0238412 A1 | 9/2011 | Ezzat |
| 2013/0073336 A1* | 3/2013 | Heath .................... G06Q 30/02 705/7.29 |
| 2014/0359480 A1* | 12/2014 | Vellal ..................... H04L 51/16 715/752 |

FOREIGN PATENT DOCUMENTS

| | | |
|---|---|---|
| CN | 1783213 A | 6/2006 |
| CN | 1945563 A | 4/2007 |
| CN | 101345051 A | 1/2009 |
| CN | 101884206 A | 11/2010 |
| CN | 102201235 A | 9/2011 |
| CN | 102510426 A | 6/2012 |
| CN | 103077714 A | 5/2013 |
| EP | 1647971 A2 | 4/2006 |
| EP | 2040250 A1 | 3/2009 |
| JP | 20050266009 A | 9/2005 |
| JP | 2006031010 A | 2/2006 |
| TW | 201117114 A1 | 5/2011 |

OTHER PUBLICATIONS

Partial English Translation and Abstract of Chinese Patent Application No. CN102510426A, Mar. 3, 2015, 45 pages.
Foreign Communication From a Counterpart Application, Chinese Application No. 201310034262.5, Chinese Office Action dated May 15, 2014, 8 pages.
Foreign Communication From a Counterpart Application, PCT Application No. PCT/CN2014/070489, English Translation of International Search Report dated Apr. 21, 2014, 4 pages.
Foreign Communication From a Counterpart Application, PCT Application No. PCT/CN2014/070489, Written Opinion dated Apr. 21, 2014, 6 pages.
Foreign Communication From a Counterpart Application, European Application No. 14745447.4, Extended European Search Report dated Aug. 14, 2015, 5 pages.

* cited by examiner

INFORMATION RECOGNITION METHOD AND APPARATUS

CROSS-REFERENCE TO RELATED APPLICATIONS

This application is a continuation of International Application No. PCT/CN2014/070489, filed on Jan. 10, 2014, which claims priority to Chinese Patent Application No. 201310034262.5, filed on Jan. 29, 2013, both of which are hereby incorporated by reference in their entireties.

TECHNICAL FIELD

The present invention relates to the field of information technologies, and in particular, to an information recognition method and apparatus.

BACKGROUND

A voice recognition technology is a technology that converts human voice input into a computer instruction, and natural human-machine interaction can be implemented by using the voice recognition technology. At present, with the development of the voice recognition technology, many terminals can implement functions such as voice dialing, voice navigation, voice control, voice search, and simple dictation entry.

In the prior art, after receiving input voice information, a terminal may send the voice information to a cloud server through a network, and then the cloud server completes voice information recognition. However, by using the cloud server to recognize the voice information, a user needs to upload some personal information to the cloud server, thereby decreasing security of user information. In addition, the network needs to be used for interaction between the terminal and the cloud server, which increases limitation on voice recognition, consumes network traffic of the user, and may also affect an experience effect of the user because a voice recognition delay is increased when the network is congested.

SUMMARY

Embodiments of the present invention provide an information recognition method and apparatus, which can implement that a terminal splits a command word of voice information according to a two-command-word-slot recognition grammar or a multi-command-word-slot recognition grammar, and recognize an operation instruction corresponding to the information according to at least one split command word. An information recognition method is provided so that more voice input content can be recognized by using the same number of command words, which improves an experience effect of a user.

According to a first aspect, an embodiment of the present invention provides an information recognition method, where the method includes receiving voice information, and extracting a voice feature from the voice information, performing matching calculation on the voice feature and a phoneme string corresponding to each candidate text in multiple candidate texts to obtain a recognition result, where the recognition result includes at least one command word and a label corresponding to the at least one command word, and recognizing, according to the label corresponding to the at least one command word, an operation instruction corresponding to the voice information.

In a first possible implementation manner, the performing matching calculation includes performing phoneme distance calculation on the voice feature and the phoneme string corresponding to each candidate text in the multiple candidate texts to obtain a distance value, and selecting a candidate text, which is corresponding to a phoneme string with a smallest distance value from the voice feature, as the recognition result.

With reference to the first aspect, in a second possible implementation manner, the recognizing an operation instruction includes recognizing, according to a combination of labels corresponding to all command words in the at least one command word, the operation instruction corresponding to the voice information.

With reference to the first aspect, in a third possible implementation manner, before the receiving voice information and extracting a voice feature from the voice information, the method further includes selecting, according to a recognition grammar network, a command word from multiple command word-slots to generate the multiple candidate texts.

With reference to the second possible implementation manner of the first aspect, in a fourth possible implementation manner, the recognizing the operation instruction includes combining a label corresponding to each command word in the at least one command word in the recognition result and querying, in a local database or a network server, an operation instruction corresponding to a combination of the label.

According to a second aspect, an embodiment of the present invention provides an information recognition apparatus, where the apparatus includes a receiving unit configured to receive voice information, extract a voice feature from the voice information, and transmit the voice feature to a matching unit. The matching unit is configured to receive the text information transmitted by the receiving unit, perform matching calculation on the voice feature and a phoneme string corresponding to each candidate text in multiple candidate texts to obtain a recognition result, where the recognition result includes at least one command word and a label corresponding to the at least one command word, and transmit the label to a recognizing unit. The recognizing unit is configured to receive the label transmitted by the matching unit and recognize, according to the label corresponding to the at least one command word, an operation instruction corresponding to the voice information.

In a first possible implementation manner, the matching unit is configured to perform phoneme distance calculation on the voice feature and the phoneme string corresponding to each candidate text in the multiple candidate texts to obtain a distance value and select a candidate text, which is corresponding to a phoneme model with a smallest distance value from the voice feature, as the recognition result.

With reference to the second aspect, in a second possible implementation manner, each command word in the at least one command word is identified by one label and the recognizing unit is configured to recognize, according to a combination of labels corresponding to all command words in the at least one command word, the operation instruction corresponding to the voice information.

With reference to the second aspect, in a third possible implementation manner, the apparatus further includes a generating unit configured to select, according to a recognition grammar network, a command word from multiple command word-slots to generate the multiple candidate texts.

With reference to the second aspect or the second possible implementation manner of the second aspect, in a fourth possible implementation manner, the recognizing unit is configured to combine a label corresponding to each command word in the at least one command word in the recognition result and query, in a local database or a network server, an operation instruction corresponding to a combination of the label.

In the embodiments of the present invention, a terminal receives voice information, extracts a voice feature from the voice information, performs matching calculation on the voice feature and a phoneme string corresponding to each candidate text in multiple candidate texts to obtain a recognition result, where the recognition result includes at least one command word and a label corresponding to the at least one command word, and recognizes, according to the label corresponding to the at least one command word, an operation instruction corresponding to the voice information. Therefore, the terminal splits a command word of the voice information according to a two-command word-slot recognition grammar or a multi-command-word-slot recognition grammar and recognizes, according to at least one split command word, the operation instruction corresponding to the voice information. An information recognition method is provided so that more voice input content can be recognized by using the same number of command words, which improves an experience effect of a user.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The technical solutions of the present invention are further described in detail with reference to the accompanying drawings and embodiments.

Figure 1:
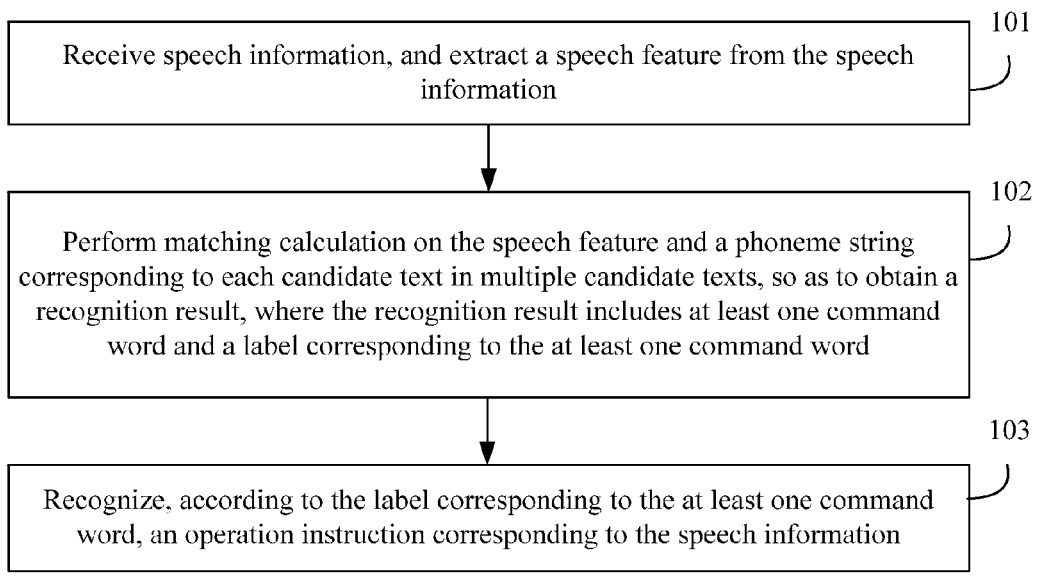
FIG. 1 is a flowchart of an information recognition method according to an embodiment of the present invention.

FIG. 1 is a flowchart of an information recognition method according to an embodiment of the present invention. This embodiment is executed by a terminal, where a method for recognizing an operation instruction after a terminal receives voice input of a user is described in detail. As shown in FIG. 1, this embodiment includes the following steps.

Step 101: Receive voice information and extract a voice feature from the voice information.

Before a terminal performs voice input, the terminal is first set to a voice information input state, according to a received operation instruction of a user, to run a voice recognition engine. When the voice recognition engine runs, a candidate text may be generated according to a recognition grammar.

After receiving the voice information, the terminal converts the voice information into digital information and extracts a corresponding voice feature from the digital information.

Step 102: Perform matching calculation on the voice feature and a phoneme string corresponding to each candidate text in multiple candidate texts to obtain a recognition result, where the recognition result includes at least one command word and a label corresponding to the at least one command word.

In order to implement the technical solutions of the present invention, in an actual application, the terminal provides a multi-command-word-slot recognition grammar. Compared with an existing "action+object" recognition grammar, a structure of the multi-command-word-slot recognition grammar is to split the action part into different parts, and recognition of more voice input content is supported by using different combinations of each part. In this way, for a same amount of voice input content, the number of command words that need to be provided for the recognition grammar may be reduced. For example, for common command words of a user including voice input content, such as "make a phone call to," "help me make a phone call to," "call," and "help me to call," part of the content, for example, "make a phone call to" or "call," is a statement shared by several pieces of voice input content. If an existing grammar recognition structure is used, voice input content such as "make a phone call to," "help me make a phone call to," "call," and "help me to call" requires 4 command elements. However, if the multi-command-word-slot recognition grammar is used, a total of only 3 command words, namely one level-1 command word "help me to" and two level-2 command words "make a phone call to" and "call" are required, thereby reducing the number of command words and facilitating maintenance and expansion of the multi-command-word-slot recognition grammar.

In the recognition grammar provided in this embodiment of the present invention, the action part in the exiting recognition grammar may be split into two levels or multiple levels. For example, the action part may be split into three levels, where a level-1 command word may be a qualifier command word, a level-2 command word may be a willingness command word, and a level-3 command word may be an action command word. Therefore, when the voice recognition engine runs, and before the voice input is received, this embodiment of the present invention further includes selecting, according to a recognition grammar network, a command word from a multi-command-word-slot to generate the multiple candidate texts. According to the multi-command-word-slot recognition grammar, one command word may be selected from each command word word-slot in the multiple command word word-slots (for a command word word-slot, no command word may also be selected), and then selected command words are combined to obtain the candidate texts. For example, in a three-level command-word-slot recognition grammar, a qualifier command word-slot has two command words: "now" and "please," a willingness command word-slot has two command words: "help me to" and "I want to," and an action command word-slot has two command words: "make a phone call to" and "call." If there is not any constraint condition, according to the recognition grammar, 26 candidate texts may be constructed, which respectively are "now," "please," "help me to," "I want to," "now help me to," "now I want to," "please help me to," "please I want to," "help me make a phone call to," "I want to make a phone call to," "help me to call," "I want to call," "now make a phone call to," "now call," "please make a phone call to," "please call," "now help me make a phone call to," "now help me to call," "now I want to make a phone call to," "now I want to call," "please help me make a phone call to," "please help me to call," "please I want to make a phone call to," "please I want to call," "make a phone call to," and "call." In order to implement a complete operation, usually the candidate text must contain an action command word. If the constraint condition is that the candidate text must contain an action command word, according to the recognition grammar, 18 candidate texts may be constructed, which respectively are "help me make a phone call to," "I want to make a phone call to," "help me to call," "I want to call," "now make a phone call to," "now call," "please make a phone call to," "please call," "now help me make a phone call to," "now help me to call," "now I want to make a phone call to," "now I want to call," "please help me make a phone call to," "please help me to call," "please I want to make a phone call to," "please I want to call," "make a phone call to," and "call." Therefore, the terminal may construct multiple candidate texts according to the multi-command-word-slot recognition grammar. By using a multi-level command-word-slot recognition grammar, more candidate texts can be constructed in a case in which the same number of command words are used. Correspondingly, more voice input content can be recognized.

The performing matching calculation on the voice feature and a phoneme string corresponding to each candidate text in multiple candidate texts includes performing phoneme distance calculation on the voice feature and the phoneme string corresponding to each candidate text in the multiple candidate texts to obtain a distance value, and selecting a candidate text, which is corresponding to a phoneme string with a smallest distance value from the voice feature, as the recognition result. After the voice feature is extracted from the voice information, matching calculation is performed on the voice feature and a phoneme model corresponding to each phoneme in the phoneme string of each candidate text to obtain a distance value between each voice feature and each phoneme. By accumulating multiple distance values between multiple pieces of pronunciation and multiple phoneme models, an accumulated distance value corresponding to one phoneme string may be obtained, where a candidate text corresponding to a phoneme string with a smallest accumulated distance value is the recognition result.

A phoneme string corresponding to each candidate text includes a series of phonemes. Each phoneme is corresponding to a phoneme model and a value may be obtained through calculation on each voice feature and all the phoneme models. An accumulated value is also obtained by calculation on the whole phoneme string and the voice feature. A candidate text corresponding to a phoneme string with a smallest accumulated distance value from the voice feature is selected as the recognition result.

For example, for a candidate text "make a telephone call to Zhang San," a corresponding phoneme string is "d," "a," "d," "ian," "h," "ua," "g," "ei," "zh," "ang," "s," and "an." Calculation is performed on each voice feature corresponding to voice input of a user and a phoneme model corresponding to each phoneme to obtain a distance value, where the value is a number greater than or equal to 0. Because a phoneme model is a group statistics feature, and a voice feature of a user is an individual feature, there is an error between the phoneme model and the voice feature. The error is a distance between the voice feature and the phoneme model. Errors between all the phonemes and the voice feature are accumulated, and an obtained value is a recognized distance between the voice feature and the phoneme string corresponding to the candidate text. A smaller distance value indicates a smaller error and further indicates that the phoneme string matches voice input content better, and the corresponding candidate text is the recognition result.

The recognition result includes at least one command word, and each command word is identified by one label. For example, "I want to make a telephone call to Zhang San" includes "I want to," "make a telephone call to," and "Zhang San," where two command words, "I want to" and "make a telephone call to," are included and one contact object, "Zhang San," is also included. A label corresponding to the "I want to" command word is "0001," and it may be known from the label that the word is a willingness command word. A label corresponding to the "make a telephone call to" command word is "0011" and it may be known from the label that an operation corresponding to the voice input is making a phone call. A label corresponding to "Zhang San" is "1000," and it may be determined by using the label that the information is contact person information.

The terminal may also not store the foregoing multi-command-word-slot recognition grammar, but obtains the recognition grammar from a network server when the multi-command-word-slot recognition grammar needs to be used.

Step 103: Recognize, according to the label corresponding to the at least one command word, an operation instruction corresponding to the voice information.

The recognizing, according to the label corresponding to the at least one command word, an operation instruction corresponding to the voice information includes querying, in a local database or a network server, an operation instruction corresponding to a combination of the label. The recognizing, according to the label corresponding to the at least one command word, an operation instruction corresponding to the voice information includes combining a label corresponding to each command word in the at least one command word in the recognition result and querying, in a local database or the network server, an operation instruction corresponding to a combination of the label in a local database or the network server.

When the candidate text is generated according to the recognition grammar, content and a label of each part of the candidate text are already determined. Therefore, a corresponding label is also already determined in each component part in the recognition result. The terminal may determine, according to a mapping relationship that is between a label and a corresponding operation instruction and stored in the local database or the network server, an operation instruction corresponding to the label.

In this embodiment of the present invention, a terminal receives voice information, extracts a voice feature from the voice information, performs matching calculation on the voice feature and multiple candidate texts to obtain a recognition result, where the recognition result includes at least one command word and a label corresponding to the at least one command word, and recognizes, according to the label corresponding to the at least one command word, an operation instruction corresponding to the voice information. Therefore, the terminal splits a command word of the voice information according to a two-command-word-slot recognition grammar or a multi-command-word-slot recognition grammar and recognizes, according to at least one split command word, the operation instruction corresponding to the voice information. An information recognition method is provided so that more voice input content can be recognized by using the same number of command words, which improves an experience effect of a user.

Figure 2:
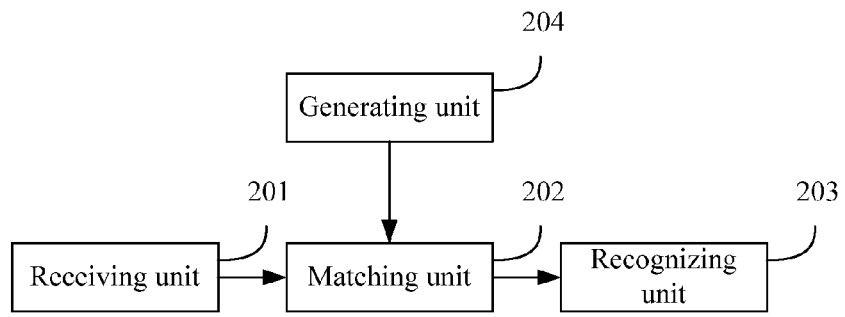
FIG. 2 is a schematic diagram of an information recognition apparatus according to an embodiment of the present invention.

Correspondingly, an embodiment of the present invention also provides an information recognition apparatus. FIG. 2 is a schematic diagram of an information recognition apparatus according to this embodiment of the present invention. As shown in FIG. 2, this embodiment of the present invention includes a receiving unit 201, a matching unit 202, and a recognizing unit 203.

The receiving unit 201 is configured to receive voice information, extract a voice feature from the voice information, and transmit the voice feature to the matching unit.

After receiving the voice information, a terminal converts the voice information into digital information, and extracts a corresponding voice feature from the digital information.

The matching unit 202 is configured to receive the text information transmitted by the receiving unit, perform matching calculation on the voice feature and a phoneme string corresponding to each candidate text in multiple candidate texts to obtain a recognition result, where the recognition result includes at least one command word and a label corresponding to the at least one command word, and transmit the label to the recognizing unit.

In order to implement the technical solutions of the present invention, in an actual application, the terminal provides a multi-command-word-slot recognition grammar. Compared with an existing "action (action)+object (object)" recognition grammar, a structure of the multi-command-word-slot recognition grammar is to split the action part into different parts, and recognition of more voice input content is supported by using a combination of different parts. In this way, for a same amount of voice input content, the number of command words that need to be provided for the recognition grammar may be reduced, thereby facilitating maintenance and expansion of the multi-command-word-slot recognition grammar.

In the recognition grammar provided in this embodiment of the present invention, the action part in the existing recognition grammar may be split into two levels or multiple levels, for example, may be split into three levels, where a level-1 command word may be a qualifier command word, a level-2 command word may be a willingness command word, and a level-3 command word may be an action command word.

The matching unit 202 is configured to perform phoneme distance calculation on the voice feature and the phoneme string corresponding to each candidate text in the multiple candidate texts, so as to obtain a distance value; and select a candidate text, which is corresponding to a phoneme string with a smallest distance value from the voice feature, as the recognition result. After the voice feature is extracted from the voice information, matching calculation is performed on the voice feature and the phoneme string of each candidate text, where a candidate text corresponding to a phoneme string with a smallest distance value is the recognition result.

The recognition result includes at least one command word, and each command word is identified by one label. For example, "I want to make a telephone call to Zhang San" includes "I want to", "make a telephone call to", and "Zhang San", where two command words: "I want to" and "make a telephone call to" are included, and one contact object "Zhang San" is also included. A label corresponding to the "I want to" command word is "0001", and it may be known from the label that the word is a willingness command word. A label corresponding to the "make a telephone call to" command word is "0011", and it may be known from the label that an operation corresponding to the voice input is making a phone call. A label corresponding to "Zhang San" is "1000", and it may be determined by using the label that the information is contact person information.

The terminal may also not store the foregoing multi-command-word-slot recognition grammar, but obtains the recognition grammar from a network server when the multi-command-word-slot recognition grammar needs to be used.

The recognizing unit 203 is configured to receive the label transmitted by the matching unit, and recognize, according to the label corresponding to the at least one command word, an operation instruction corresponding to the voice information.

The recognizing unit 203 is configured to recognize, according to a combination of labels corresponding to all command words in the at least one command word, the operation instruction corresponding to the voice information. The recognizing unit 203 is configured to: combine a label corresponding to each command word in the at least one command word in the recognition result, and query, in a local database or a network server, an operation instruction corresponding to a combination of the label.

When the candidate text is generated according to the recognition grammar, content and a label of each part of the candidate text are already determined. Therefore, a corresponding label is also already determined in each component part in the recognition result. The terminal may determine, according to a mapping relationship that is between a label and a corresponding operation instruction and stored in the local database or the network server, an operation instruction corresponding to the label.

Preferably, this embodiment of the present invention also includes a generating unit 204 configured to select, according to a recognition grammar network, a command word from multiple command word-slots to generate the multiple candidate texts. Therefore, the terminal may construct multiple candidate texts according to the multi-command-word-slot recognition grammar. By using a multi-level command-word-slot recognition grammar, more candidate texts can be constructed in a case in which the same number of command words are used. Correspondingly, more voice input content can be recognized.

Therefore, the terminal splits a command word of the voice information according to a two-command-word-slot recognition grammar or a multi-command-word-slot recognition grammar and recognizes the operation instruction corresponding to the voice information according to at least one split command word. An information recognition method is provided so that more voice input content can be recognized by using the same number of command words, which improves an experience effect of a user.

Figure 3:
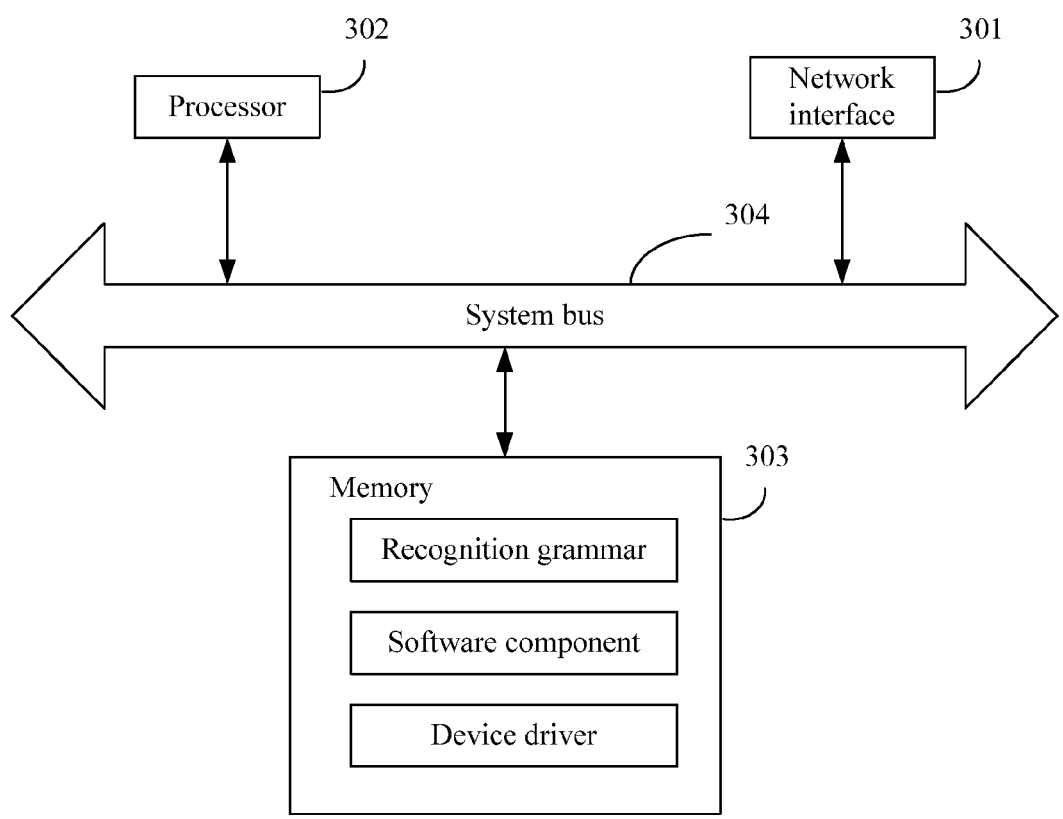
FIG. 3 is a schematic diagram of a terminal according to an embodiment of the present invention.

Correspondingly, an embodiment of the present invention also provides a terminal. FIG. 3 is a schematic diagram of a terminal according to this embodiment of the present invention. As shown in FIG. 3, this embodiment includes a network interface 301, a processor 302, and a memory 303. The system bus 304 is configured to connect the network interface 301, the processor 302, and the memory 303.

The network interface 301 is configured to communicate with another terminal or a network server.

The memory 303 may be a permanent memory, for example, a hard disk drive and a flash memory. The memory 303 has a recognition grammar, a software module, and a device driver. The software module is a functional module capable of executing the foregoing method of the present invention. The device driver may be a network and interface driver, and the recognition grammar is used to generate a candidate text and recognize a recognition result corresponding to voice input content.

When the terminal is started, the recognition grammar and a software component are loaded to the memory 303, the memory 303 is accessed by the processor 302, and the processor 302 executes instructions to receive voice information, extract a voice feature from the voice information, perform matching calculation on the voice feature and a phoneme string corresponding to each candidate text in multiple candidate texts to obtain a recognition result, where the recognition result includes at least one command word and a label corresponding to the at least one command word, and recognize, according to the label corresponding to the at least one command word, an operation instruction corresponding to the voice information.

In order to implement the technical solutions of the present invention, a multi-command-word-slot recognition grammar may be stored in the memory 303 of the terminal. Compared with an existing "action (action)+object (object)" recognition grammar, a structure of the multi-command-word-slot recognition grammar is to split the action part into different parts, and recognition of more voice input content is supported by using different combinations of each part. In this way, for a same amount of voice input content, the number of command words that need to be provided for the recognition grammar may be reduced. For example, for common command words of a user voice input content, such as "make a phone call to," "help me make a phone call to," "call," and "help me to call," part of content, for example, "make a phone call to" or "call," is a statement shared by several pieces of voice input content. If an existing grammar recognition structure is used, voice input content such as "make a phone call to," "help me make a phone call to," "call," and "help me to call" requires 4 command elements. However, if the multi-command-word-slot recognition grammar is used, a total of only 3 command words, namely one level-1 command word "help me to" and two level-2 command words "make a phone call to" and "call," are required, thereby reducing the number of command words and facilitating maintenance and expansion of the multi-command-word-slot recognition grammar.

In the recognition grammar provided in this embodiment of the present invention, the action part in the existing recognition grammar may be split into two levels or multiple levels. For example, the action part may be split into three levels, where a level-1 command word may be a qualifier command word, a level-2 command word may be a willingness command word, and a level-3 command word may be an action command word.

Further, after the processor 302 accesses the software component in the memory, an instruction for a process of performing matching calculation on the text information and multiple candidate texts is performing phoneme distance calculation on the voice feature and the phoneme string corresponding to each candidate text in the multiple candidate texts to obtain a distance value, and selecting a candidate text, which is corresponding to a phoneme string with a smallest distance value from the voice feature, as the recognition result.

Each command word in the at least one command word is identified by one label. Further, after the processor 302 accesses the software component in the memory, the recognizing, according to the label corresponding to the at least one command word, an operation instruction corresponding to the voice information includes recognizing, according to a combination of labels corresponding to all command words in the at least one command word, the operation instruction corresponding to the voice information.

Further, a processor recognizing, according to a combination of labels corresponding to all command words in the at least one command word, the operation instruction corresponding to the voice information includes combining a label corresponding to each command word in the at least one command word in the recognition result and querying, in a local database or a network server, an operation instruction corresponding to a combination of the label.

Further, before the processor 302 executes an operation of performing matching calculation on the text information and the candidate text, the processor 302 may further access the software component and execute the an instruction for selecting, according to a recognition grammar network, a command word from multiple command word-slots to generate the multiple candidate texts.

Therefore, the terminal splits a command word of the voice information according to a two-command-word-slot recognition grammar or a multi-command-word-slot recognition grammar and recognizes the operation instruction corresponding to the voice information according to at least one split command word. An information recognition method is provided, so that more voice input content can be recognized by using the same number of command words, which improves an experience effect of a user.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

The foregoing specific embodiments clarify the objective, technical solutions, and benefits of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. An information recognition method, comprising:
selecting, by a terminal and according to a recognition grammar network, multiple command words from multiple command word-slots to generate multiple candidate texts, wherein the multiple command word-slots comprise multiple command words generated by splitting an action part of a recognition grammar into at least two levels;
receiving, by the terminal, voice information;
converting, by the terminal, the voice information into digital voice information;
extracting, by the terminal, a voice feature from the digital voice information;
performing, by the terminal, a matching calculation on the voice feature and a phoneme string corresponding to each candidate text in the multiple candidate texts to obtain a recognition result, wherein the recognition result comprises at least one command word and a label corresponding to the at least one command word; and
recognizing, by the terminal and according to the label corresponding to the at least one command word, an operation instruction corresponding to the voice information.

2. The information recognition method according to claim 1, wherein performing the matching calculation comprises:
performing a phoneme distance calculation on the voice feature and the phoneme string corresponding to each candidate text in the multiple candidate texts to obtain a distance value; and
selecting a candidate text, which is corresponding to a phoneme string with a smallest distance value from the voice feature, as the recognition result.

3. The information recognition method according to claim 1, wherein each command word in the at least one command word is identified by one label, and wherein recognizing the operation instruction comprises recognizing, according to a combination of at least one label corresponding to the at least one command word in the at least one command word, the operation instruction corresponding to the voice information.

4. The information recognition method according to claim 3, wherein recognizing the operation instruction corresponding to the voice information comprises:
combining a label corresponding to each command word in the at least one command word in the recognition result; and
querying, in a local database or a network server, an operation instruction corresponding to the combination of the label.

5. A terminal comprising:
a network interface;
a processor;
a memory; and
a system bus configured to connect the network interface, the processor, and the memory, wherein the memory is configured to store a computer program, and wherein the processor is configured to run the computer program and cause the terminal to:
select, according to a recognition grammar network, multiple command words from multiple command word-slots to generate multiple candidate texts, wherein the multiple command word-slots comprise multiple command words generated by splitting an action part of a recognition grammar into at least two levels;
receive voice information;
convert the voice information into digital voice information;
extract a voice feature from the digital voice information;
perform a matching calculation on the voice feature and a phoneme string corresponding to each candidate text in the multiple candidate texts to obtain a recognition result, wherein the recognition result comprises at least one command word and a label corresponding to the at least one command word; and
recognize, according to the label corresponding to the at least one command word, an operation instruction corresponding to the voice information.

6. The terminal according to claim 5, wherein to perform the matching calculation the processor is configured to:
perform phoneme distance calculation on the voice feature and the phoneme string corresponding to each candidate text in the multiple candidate texts to obtain a distance value; and
select a candidate text, which is corresponding to a phoneme string with a smallest distance value from the voice feature, as the recognition result.

7. The terminal according to claim 5, wherein each command word in the at least one command word is identified by one label, and wherein to recognize the operation instruction corresponding to the voice information the processor is configured to recognize, according to a combination of at least one label corresponding to the at least one command word in the at least one command word, the operation instruction corresponding to the voice information.

8. The terminal according to claim 7, wherein the processor is configured to:
combine a label corresponding to each command word in the at least one command word in the recognition result; and
query, in a local database or a network server, an operation instruction corresponding to the combination of the label.

9. A computer program product comprising a non-transitory computer readable storage medium storing program code thereon for use by a terminal, the program code comprising instructions for:
selecting, according to a recognition grammar network, multiple command words from multiple command word-slots to generate multiple candidate texts, wherein the multiple command word-slots comprise multiple command words generated by splitting an action part of a recognition grammar into at least two levels;
receiving voice information;
converting the voice information into digital voice information;
extracting a voice feature from the digital voice information;
performing matching calculation on the voice feature and a phoneme string corresponding to each candidate text in the multiple candidate texts to obtain a recognition result, wherein the recognition result comprises at least one command word and a label corresponding to the at least one command word; and
recognizing, according to the label corresponding to the at least one command word, an operation instruction corresponding to the voice information.

* * * * *